United States Patent [19]

Morita

[11] Patent Number: 4,613,118
[45] Date of Patent: Sep. 23, 1986

[54] FLUID-SEALED ENGINE MOUNTING

[75] Inventor: Isamu Morita, Saitama, Japan

[73] Assignee: Honda Giken Kogyo Kabushiki Kaisha, Tokyo, Japan

[21] Appl. No.: 581,153

[22] Filed: Feb. 17, 1984

[30] Foreign Application Priority Data

| Feb. 17, 1983 | [JP] | Japan | 58-25320 |
| Feb. 17, 1983 | [JP] | Japan | 58-25321 |
| Feb. 17, 1983 | [JP] | Japan | 58-25322 |
| Feb. 17, 1983 | [JP] | Japan | 58-25323 |
| Feb. 17, 1983 | [JP] | Japan | 58-25324 |

[51] Int. Cl.$^4$ .............................................. F16F 9/08
[52] U.S. Cl. .................................. 267/140.1; 248/562
[58] Field of Search ...................... 248/562, 559, 565; 267/140.1, 140.3, 141, 151, 152, 122, 135; 188/268

[56] References Cited

U.S. PATENT DOCUMENTS

| 2,822,164 | 2/1958 | Boschi | 267/140.3 |
| 3,368,807 | 2/1968 | Thrasher | 188/268 |
| 3,897,856 | 8/1975 | Pineau | 267/140.3 |
| 4,352,487 | 10/1982 | Shtarkman | 248/562 |
| 4,416,445 | 11/1983 | Coad | 248/562 |
| 4,418,895 | 12/1983 | Bertin | 248/562 |
| 4,420,060 | 12/1983 | Kakimoto | 267/141 |
| 4,428,569 | 1/1984 | Takei | 267/140.1 |
| 4,445,662 | 5/1984 | Fukushima | 248/559 |

FOREIGN PATENT DOCUMENTS

| 2500555 | 8/1982 | France | 267/140.1 |
| 56-28018 | 3/1981 | Japan . |
| 56-153153 | 3/1981 | Japan . |
| 56-66539 | 6/1981 | Japan | 267/140.1 |
| 57-76340 | 5/1982 | Japan | 267/140.1 |
| 0173633 | 10/1982 | Japan | 267/141 |

Primary Examiner—J. Franklin Foss
Assistant Examiner—Robert A. Olson
Attorney, Agent, or Firm—Armstrong, Nikaido, Marmelstein & Kubovcik

[57] ABSTRACT

A fluid-sealed engine mounting comprising a connector for being connected to an engine, a base for being mounted on a vehicle frame, and an elastic member joining the connector to the base, the connector, the base, and the elastic member jointly defining a fluid chamber in which a fluid is sealed. The fluid-sealed engine mounting has a variable-volume member mounted on one of the connector and the base in the fluid chamber and containing at least a gas sealed therein, the first variable-volume member being expandable and contractable in a direction in which vibrations are transmitted in the fluid chamber.

12 Claims, 25 Drawing Figures

FIG.25

FLUID-SEALED ENGINE MOUNTING

BACKGROUND OF THE INVENTION

1. Field of the Invention

The present invention relates to a mounting for being interposed between an engine and a vehicle frame, and more particularly to the structure of a fluid-sealed engine mounting having therein a chamber in which a fluid is sealed.

2. Description of the Prior Art

One known type of fluid-seal engine mounting comprises a connector adapted to be connected to an engine, a base adapted to be connected to a vehicle frame, an elastic member joined between the connector and the base and elastically deformable as vibrations are transmitted therethrough. The mounting has a main chamber defined substantially by at least two of the connector, base, and elastic member, and an auxiliary chamber separated from the main chamber by a partition having an orifice. Such an engine mounting is disclosed in Japanese Laid-Open Patent Publications Nos. 56-28018, 56-153133, and 57-76340, for example. However, the prior engine mountings have failed to sufficiently shut off engine vibrations from transmittion to the vehicle frame since they are virtually constructed such that the two fluid chambers are merely kept in mutual communication through an orifice. The known engine mountings cannot smoothly dampen shocks of large amplitude caused by transient engine vibrations at the time the engine is started or idling.

The present invention has been made in view of drawbacks with the conventional fluid-sealed engine mounting.

SUMMARY OF THE INVENTION

It is a primary object of the present invention to provide a fluid-sealed engine mounting having an increased ability to block or dampen engine vibrations.

Another object of the present invention is to provide a fluid-sealed engine mounting capable of smoothly dampening transient vibrations of large amplitude produced at an initial stage of engine operation.

Still another object of the present invention is to provide an arrangement of fluid-sealed engine mountings which is capable of reducing a bending moment produced by engine vibrations and tending to bend a vehicle body.

According to the present invention, there is provided a fluid-sealed engine mounting for mounting an engine on a vehicle frame, comprising a connector adapted to be connected to the engine, a base adapted to be connected to the vahicle frame, a resilient member jointing the connector and the base to each other, the connector, the base, and the resilient member jointly defining a fluid chamber in which a fluid is sealed, and a first variable-volume member mounted on one of the connector and the base in the fluid chamber and containing at least a gas sealed therein, the first variable-volume member being expandable and contractable in a direction in which vibrations are transmitted in the fluid chamber.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
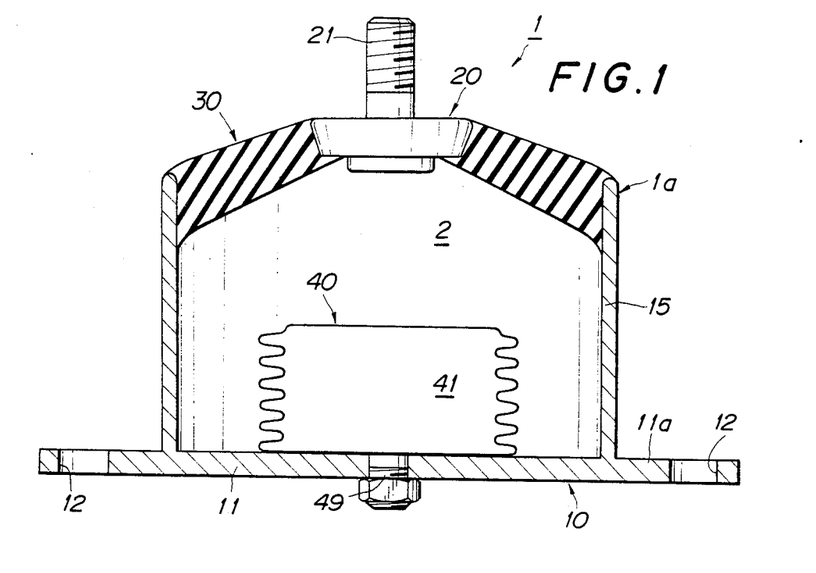
FIG. 1 is a vertical cross-sectional view of a fluid-sealed engine mounting according to a first embodiment of the present invention.

As shown in FIG. 1, a fluid-sealed engine mounting 1 includes a body 1a composed of a base 10 adapted to be fixed to a vehicle frame (not shown), a connector 20 adapted to be connected to an engine (not shown), and a ring-shaped elastic member 30 joining the base 10 and the connector 20.

The base 10 comprises a base plate 11 and an upstanding cylindrical body 15 disposed on an upper surface of the base plate 11. The base plate 11 includes a flange 11a extending radially outwardly of the cylindrical body 15 and having attachment holes 12 for fastening attachment to the vehicle frame. The ring-shaped elastic member 30 is made of shearing-resistant elastomeric rubber and has its outer peripheral surface bonded, by baking, to an upper inner peripheral surface of the cylindrical body 15. The connector 20 comprises a thick circular plate. The ring-shaped elastic member 30 has an inner peripheral surface bonded, by baking, to an outer peripheral surface of the thick circular plate of the connector 20. The connector 20 is thus concentric with the cylindrical member 15 and has a central attachment bolt 21 projecting upwardly away from the base plate 11 for direct or indirect attachment to the engine.

The base plate 11 of the base 10, the cylindrical body 15, the elastic member 30, and the connector 20 jointly define a chamber 2 in which a liquid is filled and sealed.

A variable-volume member 40 is disposed in the chamber 2 on the base plate 11 of the body 1a. In the embodiment shown in FIG. 1, the variable-volume member 40 comprises a bellows made of metal fastened by an attachment bolt 49 to the upper surface of the base plate 11 in concentric relation to the cylindrical body 15.

In the arrangement of FIG. 1, only a gas is sealed in the bellows 40, and hence the bellows 40 defines a gas chamber 41 therein.

Figure 2:
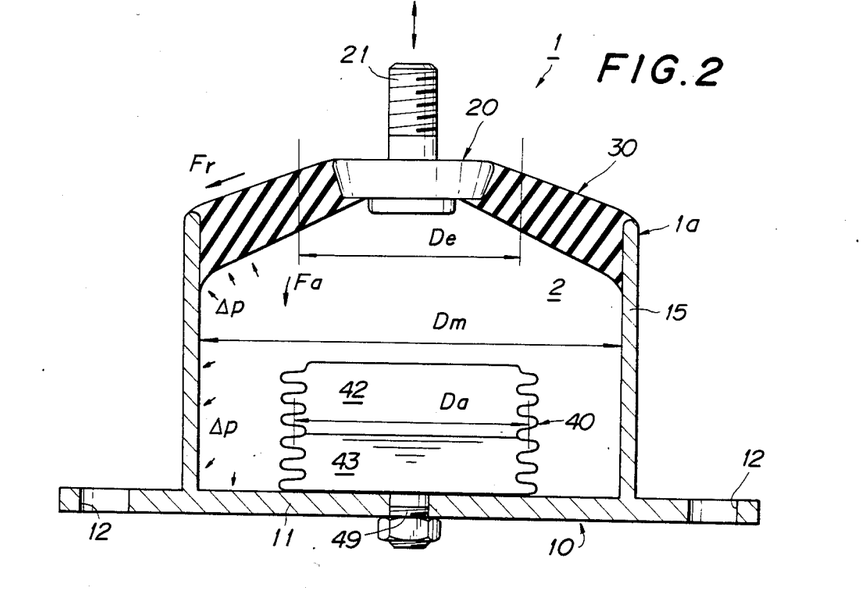
FIG. 2 is a view similar to FIG. 1, showing a modified fluid-sealed engine mounting in which a gas and a liquid are sealed in a variable-volume bellows.

According to a modification shown in FIG. 2, a gas and a liquid are sealed in the bellows 40 such that the bellows 40 defines therein an upper gas chamber 42 and a lower liquid chamber 43.

Operation of the fluid-sealed engine mounting thus constructed according to the present invention will be described with particular reference to FIG. 2.

Engine vibration transmitted from the connector 20 is divided into a force Fr transmitted through the elastic member 30 to the cylindrical body 15 and a force Fa transmitted through the liquid sealed in the chamber 2 to the base plate 11. The sum F of the forces Fr and the force Fa acts on the vehicle frame.

The liquid in the chamber 2 is generally subjected to a pressure change $\Delta p$ due to the applied engine vibration, the pressure change $\Delta p$ acting uniformly in the entire liquid. To determine the force Fa transmitted through the liquid to the base 10 with the vertical transmission of the engine vibration in mind, an effective cross-sectional area $(\pi/4)Dm^2$ (where Dm is the inside diameter of the cylindrical body 15) of the cylindrical body 15 or the bottom surface of the chamber 2 is first found, and then an effective cross-sectional area $(\pi/4)DM^2$ (where De is the diameter of a portion subjected to the vibration) of a peripheral portion around the connector 20 which directly undergoes the engine vibration is found and subtracted from the effective cross-sectional area $(\pi/4)Dm^2$ to find $(\pi/4)(Dm^2-De^2)$. Then, the difference between $(\pi/4)Dm^2$ and $(\pi/4)(Dm^2-De^2)$ is found as $(\pi/4)Dm^2$ which is multiplied by the pressure change $\Delta p$ as follows:

$$Fa = (\pi/4)De^2 \cdot \Delta p$$

This force Fa acts on the entire surface of the bottom of the chamber 2.

According to the embodiments shown in FIGS. 1 and 2, since the air chamber 41, 42 is provided in the bellows 40 on the base 10 in the chamber 2, the air chamber 41, 42 is expanded and contracted to expand and contract the bellows 40 by the pressure change of the liquid in the chamber 2 which acts in an effective cross-sectional area $(\pi/4)Da^2$ (where Da is the average inside diameter of the bellows 40) in the bellows 40. Therefore, the base plate 11 constituting the bottom of the chamber 2 in the body 1a is subjected to a force Fa expressed by:

$$FA = (\pi/4)(De_2 - Da^2) \cdot \Delta p$$

As a consequence, the engine mounting of the invention can shut off transmission of the engine vibration by an amount expressed by $(\pi/4)Da^2 \cdot \Delta p$ as compared with the conventional fluid-sealed engine mounting.

The engine mounting of the invention operates such that the gas chamber 41, 42 in the bellows 40 can change its volume vertically in the direction in which the engine vibration is transmitted in response to high-frequency vibrations produced while the engine rotates at high speed. The engine mounting can therefore block transmission of high-frequency engine vibrations to the vehicle body to a large extent.

In the modification of FIG. 2, the liquid chamber 43 provided in the bellows 40 functions to limit the amount of contraction of the bellows 40, so that a contractable limit for the bellows 40 can be established.

Figure 3:
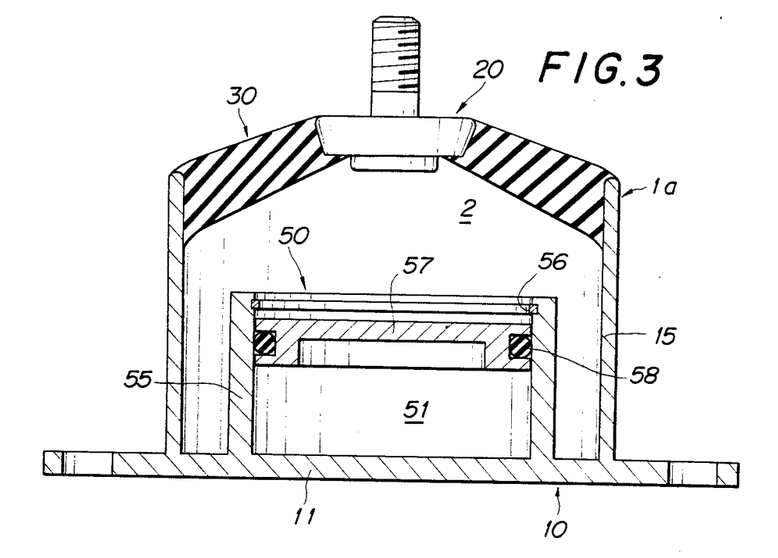
FIG. 3. is a view similar to FIG. 1, showing a modified fluid-sealed engine mounting having a free-piston device serving as a variable-volume member.
Figure 4:
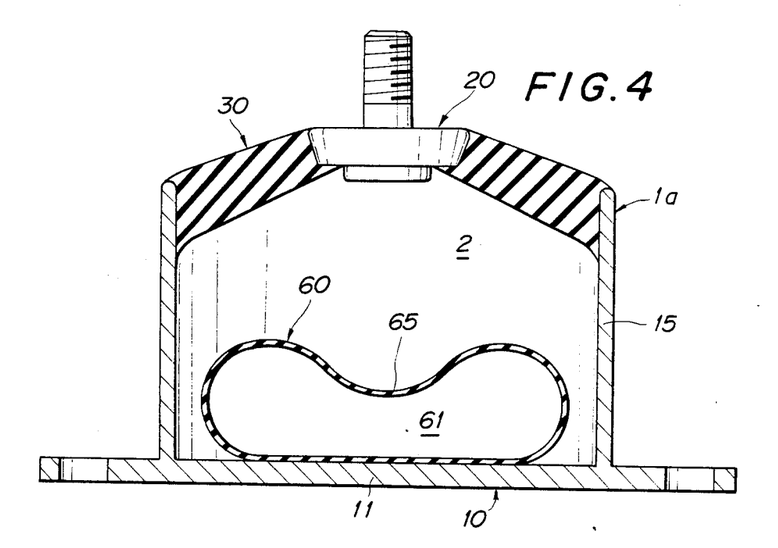
FIG. 4 is a view similar to FIG. 1, showing a modified fluid-sealed engine mounting having a resilient bag serving as a variable-volume member.

The variable-volume member disposed in the chamber 2 in the body 1a may comprise a free-piston device 50 as shown in FIG. 3 or an elastic bag 60 as shown in FIG. 4.

The modifications of FIGS. 3 and 4 will be described in detail. The fundamental construction of engine mountings shown in FIGS. 3 and 4 is the same as that of the engine mountings of FIGS. 1 and 2, and identical parts shown in FIGS. 3 and 4 are denoted by identical reference characters in FIGS. 1 and 2, and will not be described.

The free-piston device 50 shown in FIG. 3 comprises an upstanding cylinder 55 disposed on the upper surface of the base plate 11 concentric with the cylindrical body 15 and a free piston 57 slidably fitted in the cylinder 55 for vertical movement therein. A stop ring 56 is fitted in an upper inner peripheral surface of the cylinder 55, and a seal ring 58 is fitted in an outer peripheral surface of the free piston 57. A gas is sealed in the cylinder 55, and hence the cylinder 55 defines therein a gas chamber 51.

In FIG. 4, the elastic bag 60 is made of rubber and defines a gas chamber 61 therein. The bag 60 is bonded by adhesive to the upper surface of the base plate 11 and has a partly spherical recess 65 on an upper central portion of the bag 60.

The free-piston device 50 and the bag 60 according to the modifications shown in FIGS. 3 and 4 are capable of shutting off high-frequency vibrations in the same manner as described above. Where a liquid is sealed in the free-piston device 50 and the bag 60, the liquid chamber defined therein serves as a stop for establishing a contractable limit for the free-piston device 50 and the bag 60.

While in the foregoing embodiments the variable-volume member is mounted on the base 10, it may be attached to the connector 20 for the same results.

Figure 5:
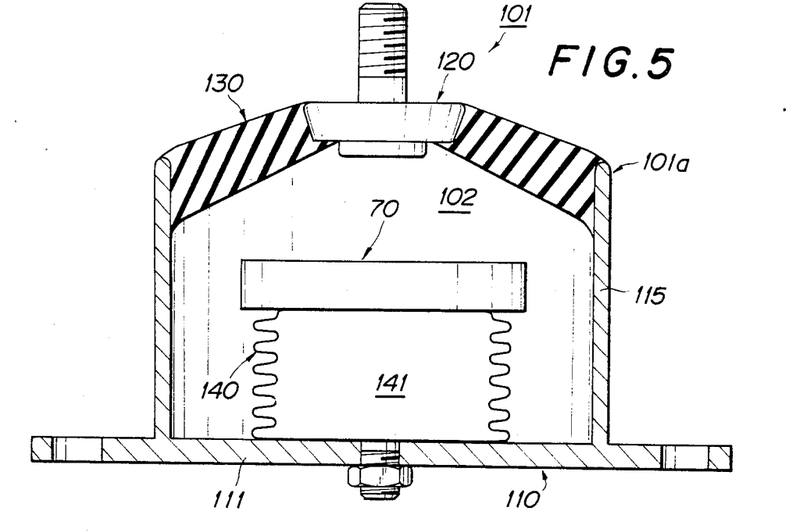
FIG. 5 is a vertical cross-sectional view of a fluid-sealed engine mounting according to a second embodiment of the present invention, in which a weight is fixed to an upper end of a variable-volume member.
Figure 6:
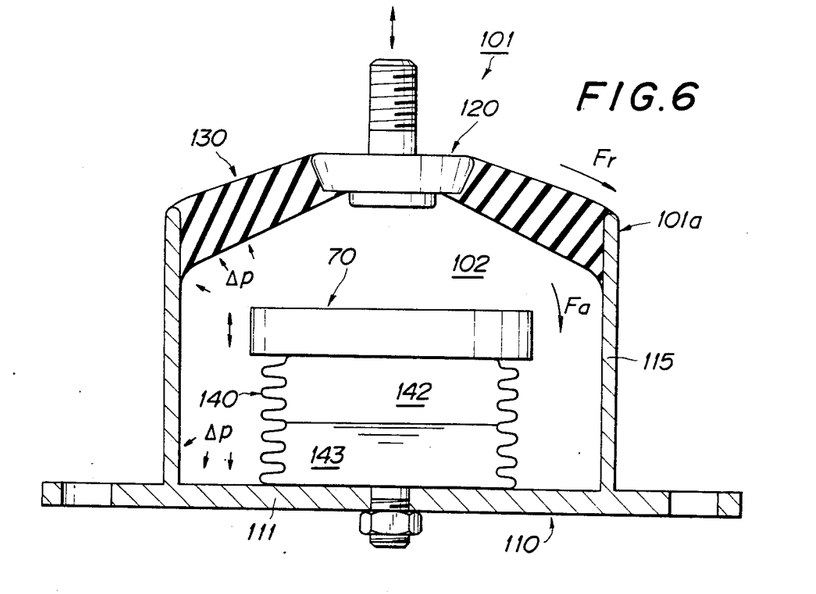
FIGS. 6 through 8 are views similar to FIG. 5, showing modifications of the fluid-sealed engine mounting of the second embodiment.

FIGS. 5 and 6 illustrate an embodiment and its modification in which weights in the form of thick circular plates are fixed to the entire upper free ends of the bellows shown in FIGS. 1 and 2. The members and construction other than the weights are basically the same as those illustrated in FIGS. 1 and 2, and identical parts shown in FIGS. 5 and 6 are denoted by identical reference characters in FIGS. 1 and 2, added to 100, and their fundamental structure will not be described in detail.

The weight 70 is fixedly mounted on the upper end of the bellows 140 concentrically with a cylindrical body 115 of a base 110 in a chamber 102 of a mounting 101.

Operation of the fluid-sealed engine mounting 101 shown in FIGS. 5 and 6 is as follows:

Assuming that a peripheral portion around a connector 120 directly subjected to engine vibration having an amplitude X has an effective cross-sectional area Se ($\pi/4$)De$^2$) and the bellows 140 has an effective cross-sectional area Sa ($\pi/4$Da$^2$), the weight 70 having a mass m is subjected to vibration having a forced amplitude (Se/Sa)·X, and hence a force expressed by m·d$^2$/dt$^2$)·{(Se/Sa)·X} is vertically imposed on the weight 70. By selecting the cross-sectional areas so that Se/Sa>>1, a large acting force can be generated even if the mass of the weight 70 is small.

According to the conventional fluid-sealed engine mounting, the force Fa acts the entire surface of the base plate 111 serving as the bottom of the chamber 102. With this embodiment, however, the force m·(d$^2$/dt$^2$)·{(Se/Sa)·X} acts from the weight 70 in the effective cross-sectional area Sa in the bellows 140 to thereby expand and contract gas chamber 141, 142 in the bellows 140 which is then expanded and contracted. Consequently, the force from the weight 70 acts to reduce or cancel out the force Fa transmitted through the liquid to the base plate 111 of the base 110.

The weight 70 is forcibly vibrated due to low- and medium-frequency engine vibrations while the engine is idling and rotating at low and medium speeds, thus causing the gas chamber 141, 142 in the bellows 140 to change its volume vertically or in the direction in which the vibration is transmitted. This can greatly reduce transmission of low- and medium-frequency engine vibrations to the vehicle body.

Figure 14:
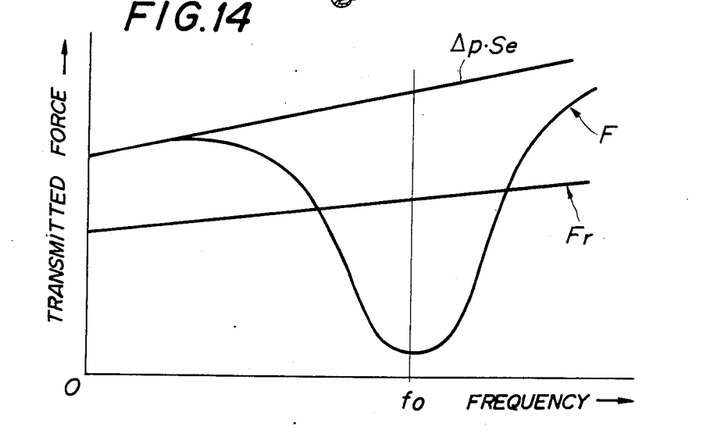
FIG. 14 is a graph showing a transmitted-force vs. frequency characteristic curve of the fluid-sealed engine mounting according to the present invention.

FIG. 14 illustrates characteristic curves of transmitted forces plotted against frequencies. As shown, idling vibrations which are the sum F of forces transmitted to the vehicle body can be lowered to a large extent by selecting the natural frequency fo of the weight 70 to be in an idling resonant range of the engine.

As the frequency of vibrations from the engine becomes higher, the force of the weight tending to suppress the expansion and contraction stroke of the variable-volume member also becomes larger. In a high-frequency vibration range in a high engine RPM range, the gas chamber in the variable-volume member is less subjected to volume changes, and the liquid pressure in the chamber in the mounting body is virtually subjected to a higher variation, that is, the total spring constant is increased.

Figure 7:
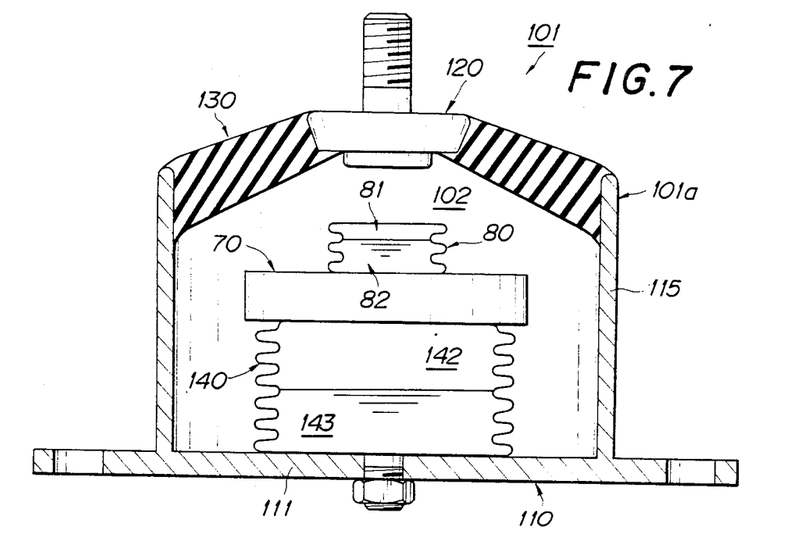

To improve such a condition, a second variable-volume member 80 is mounted on an upper surface of the weight 70 according to a further modification as shown in FIG. 7.

The basic construction of a fluid-sealed engine mounting 101 illustrated in FIG. 7 is the same as that of the engine mounting shown in FIGS. 5 and 6, and identical parts in FIG. 7 are denoted by identical reference characters in FIGS. 5 and 6 and will not be described in detail.

The second variable-volume member 80 comprises a bellows of metal having a smaller volume and concentrically bonded to the upper surface of the weight 70. A gas and a liquid are sealed in the second bellows 80, which thus has an upper second gas chamber 81 and a lower second liquid chamber 82. According to the modification shown in FIG. 7, high-frequency vibrations having smaller strokes in general are absorbed by changes in the volume of the second gas chamber 81, for thereby reducing transmission of such high-frequency vibrations to the vehicle body. The second liquid chamber 82 serves as a stop for preventing excessive contractive deformation of the second bellows 80.

Figure 8:
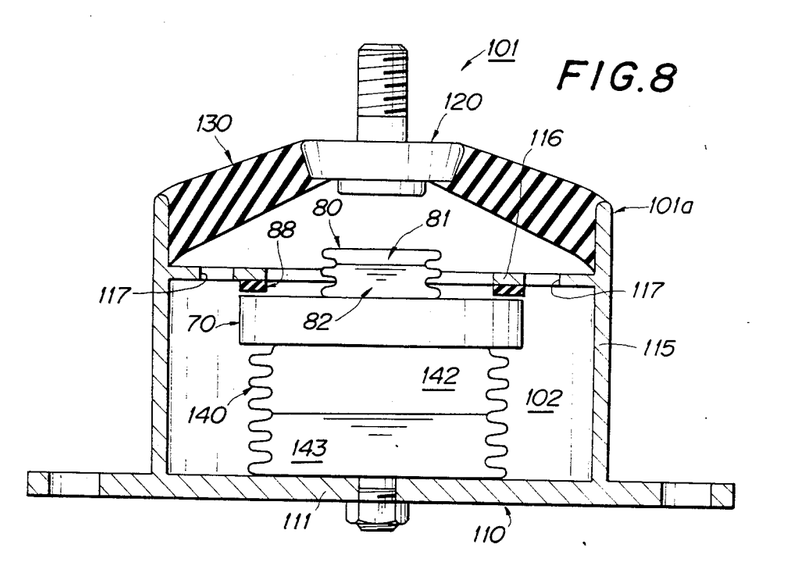

FIG. 8 is illustrative of another modification in which the cylindrical body 115 of the base 110 has a ring plate 116 projecting radially inwardly from an inner peripheral surface thereof near an upper end thereof. The ring plate 116 has an inside diameter larger than the outside diameter of the second bellows 80 and smaller than the outside diameter of the weight 70. A rubber ring 88 is bonded, by baking, to a lower inner peripheral edge of the ring plate 116. The rubber ring 88 serves as a stop for limiting upward movement of the weight 80.

While in the modifications of FIGS. 7 and 8 a liquid is sealed in the second bellows 80 for stopping excessive contractive deformation of the second bellows 80, the second bellows 80 may contain only a gas. The ring plate 116 has apertures 117 defined therethrough as shown in FIG. 8.

According to the second embodiment and its various modifications, the body of the fluid-sealed engine mounting is constructed of the base 110 comprising the base plate 111 and the upstanding cylindrical body 115 mounted thereon, the elastic member 130 made of umbrella-shaped spring rubber resistant to shearing, and the connector 120.

Figure 9:
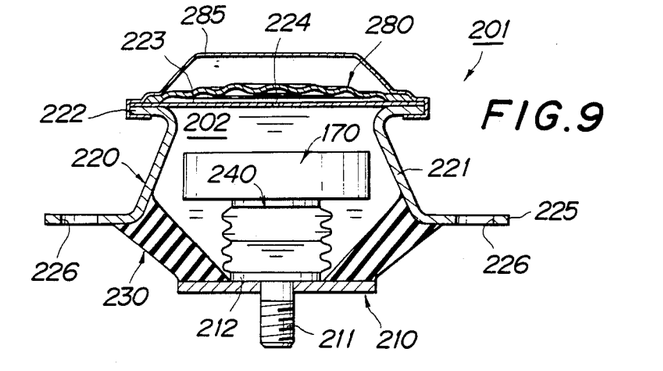
FIG. 9 is a vertical cross-sectional view of a fluid-sealed engine mounting according to a third embodiment of the present invention, showing a different engine mounting body.

FIG. 9 shows a fluid-sealed engine mounting 201 constructed in accordance with a third embodiment of the present invention. The fluid-sealed engine mounting 201 has a body 201a including a base 210 in the form of a circular plate with a central bolt 211 fixed thereto and depending therefrom for connection to a vehicle body, an inversed-umbrella-shaped elastic member 230 of shearing-resistant spring rubber having a lower end bonded, by baking, to an upper outer peripheral edge of the base 210, an attachment 220 having a barrel 221 in the form of a truncated cone with its lower end bonded, by baking, to an upper end of the elastic member 230, a circular plate 223 mounted on an upper flange 222 on an upper end of the barrel 221, a diaphragm 280 placed on the circular plate 223, and an upper cover 285 joining the upper flange 222, the upper plate 223, and the diaphragm 280 by staking.

The barrel 221 has a lower flange 225 having attachment holes 226 for insertion therethrough of bolts for attachment to an engine. The upper plate 223 has a central orifice 224.

The base 210, the elastic member 230, the barrel 221, the diaphragm 280 jointly define a chamber 202 filled with a liquid. The bolt 211 extending downwardly through the base 210 has a flanged head 212 on which is mounted an upstanding bellows 240 with a gas and a liquid sealed therein. A weight 170 is fixed to an upper surface of the bellows 240.

Figure 10:
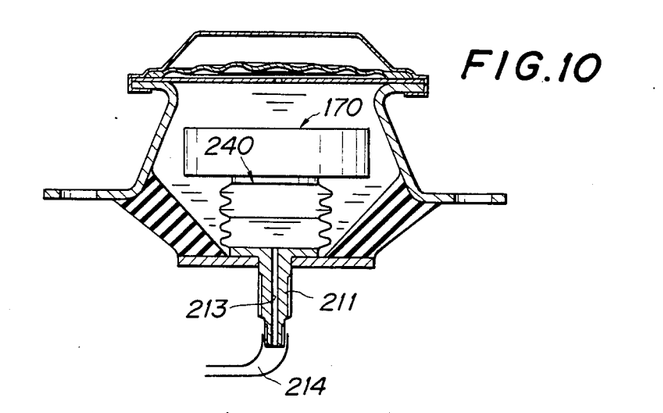
FIGS. 10 through 11 are views similar to FIG. 9, illustrative of modifications of the fluid-sealed engine mounting of the third embodiment.

As shown in FIG. 10, the bolt 211 may have a vertical through aperture 213 and a connector tube 214 may be connected to the aperture 213 to provide communication between the liquid in the bellows 240 and a tank (not shown).

Figure 11:
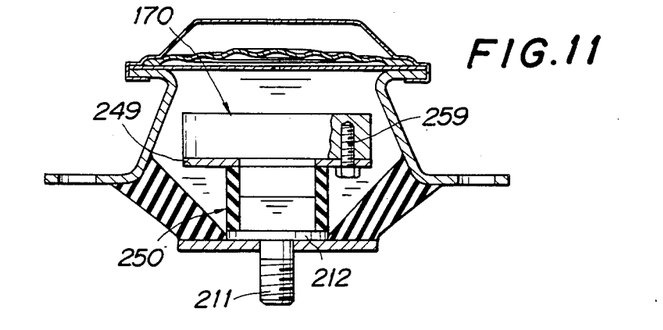

As illustrated in FIG. 11, the bellows 240 may be replaced with a rubber pipe 250 serving as a variable-volume member. The rubber pipe 250 has a lower end bonded, by baking, to an upper surface of the flanged head 212 of the bolt 211 and an upper end surface to which a circular attachment plate 249 is bonded, by baking, with the weight 170 fastened to an upper surface of the attachment plate 249 by bolts 259.

Figure 12:
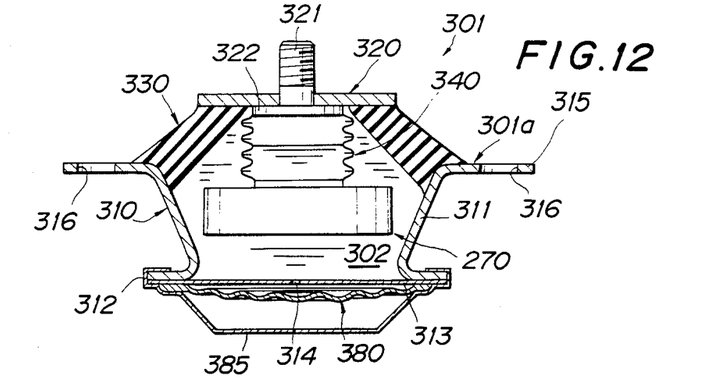
FIG. 12 is a vertical cross-sectional view of a fluid-sealed engine mounting according to a fourth embodiment of the present invention, in which a variable-volume bellows depends from a connector.

While in the second and third embodiments the upstanding variable-volume member is mounted on the base and the weight is fixed to the upper end of the variable-volume member, the base and the weight may be attached in depending relation to the attachment according to a fourth embodiment shown in FIG. 12.

FIG. 12 illustrates a fluid-sealed engine mounting 301 comprising a body 301a composed of a base 310 having a barrel 311 in the form of a truncated cone having a lower flange 312 on a lower end thereof and an upper flange 316 on an upper end, an elastic member 330 made of umbrella-shaped shearing-resistant spring rubber bonded at a lower end thereof, by baking, to an upper end of the base 310, an attachment 320 in the form of a circular plate bonded at a lower outer peripheral edge, by baking, to an upper end of the elastic member 330, a circular plate 313 held against a lower surface of the lower flange 312 of the barrel 311, a diaphragm 380 held against a lower surface of the circular plate 313, and an under cover 385 joining the lower flange 312, the circular plate 313, and the diaphragm 380 by staking.

The upper flange 315 of the barrel 311 has attachment holes 316 for attachment to a vehicle body. The attachment 320 supports a central bolt 321 projecting upwardly therethrough and fixed thereto for connection to an engine. The circular plate 313 has a central orifice 314.

The barrel 311 of the base 310, the elastic member 330, the attachment 320, and the diaphragm 380 jointly define a chamber 302 filled with a liquid.

The bolt 321 has a flanged head 322 held against the lower surface of the attachment 320. A bellows 340 depends from and is secured to a lower surface of the flanged head 322, there being a gas and a liquid sealed in the bellows 340. A weight 270 is fixed to a lower surface of the bellows 340.

Figure 13:
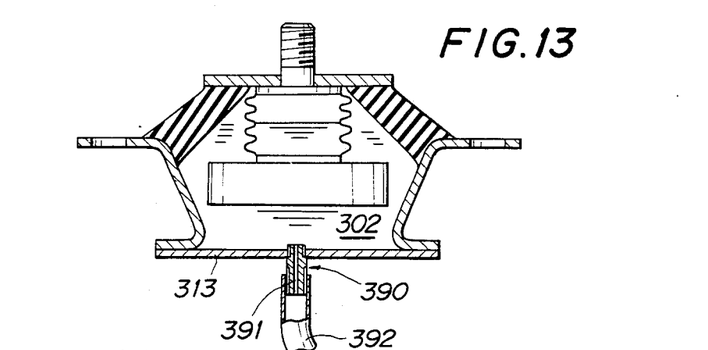
FIG. 13 is a view similar to FIG. 12, illustrating a modification of the fluid-sealed engine mounting of the fourth embodiment.

As shown in FIG. 13, the diaphragm 380 may be dispensed with, a tube connector 390 with a through hole 391 may be attached to and extend through a central portion of the circular plate 313, and a connector tube 392 may be connected to the connector tube 390 for communication between the liquid in the chamber 302 in the body 301a and a tank (not shown).

The constructions shown in FIGS. 9 through 13 are also capable of greatly reducing transmission of engine vibrations at low and medium frequencies.

Figure 15:
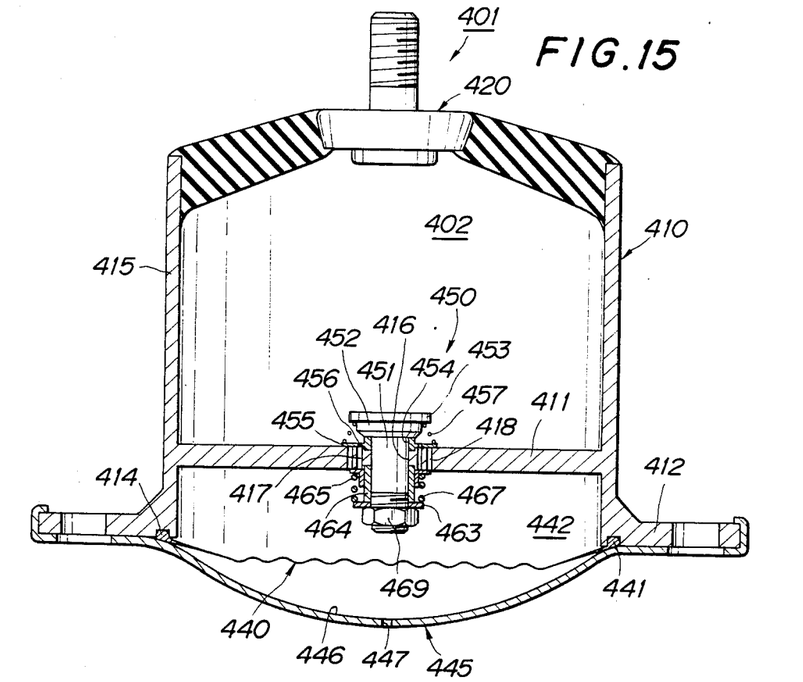
FIG. 15 is a vertical cross-sectional view of a fluid-sealed engine mounting according to a fifth embodiment of the present invention, the engine mounting having a shock dampening valve mechanism.
Figure 16:
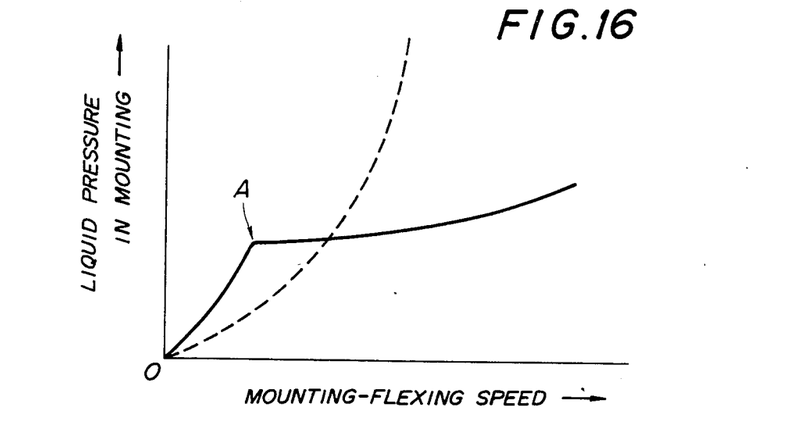
FIG. 16 is a graph showing a mounting-flexing-speed vs. sealed-liquid-pressure characteristic curve of the fluid-sealed engine mounting shown in FIG. 15.

FIGS. 15 and 16 show a fluid-sealed engine mounting 401 according to a fifth embodiment of the present invention. The fluid-sealed engine mounting 401 of the fifth embodiment is designed particularly for smoothly dampening shocks of large amplitudes due to transient vibrations at the time an engine is started.

As shown in FIG. 15, the fluid-sealed engine mounting 401 comprises a base 410 having a cylindrical body 415 including a partition 411 extending radially inwardly from a lower inner peripheral surface and an attachment flange 412 extending radially outwardly from an outer peripheral surface at a lower end thereof. The attachment flange 412 has a ring groove 414 defined in a lower inner surface with a ring frame 441 of a diaphragm 440 is fitted from below in the ring groove 414. The diaphragm 440 has a lower surface covered with an under cover 445 having a central web 446 bulging outwardly. The partition 411 and the diaphragm 440 jointly define an auxiliary chamber 442.

The central web 446 of the under cover 445 has a central hole 447 vented to atmosphere. The partition 411 has a central bolt hole 416, small holes 417 positioned around the bolt hole 416 in a circular pattern, and small holes 418 positioned around the holes 417 in a circular pattern.

A bolt 451 is inserted from above through the bolt hole 416 with a sleeve 454 interposed between a head 452 of the bolt 451 and a peripheral edge of the bolt hole 416. A ring plate valve 455 is loosely fitted around the sleeve 454. A coil spring 457 is disposed under compression between an upper surface of the valve 455 and a spring seat 453 on the bolt head 452.

A sleeve 464 is fitted over a portion of the bolt 451 projecting downwardly of the partition 411. A nut 469 is threaded over the projecting bolt end with a ring-shaped spring seat 463 interposed between a lower end of the sleeve 464 and the nut 469. A ring-shaped valve 465 having a hook-shaped cross section is loosely fitted over the sleeve 464. A coil spring 467 is disposed under compression between a lower surface of the valve 465 and the spring seat 463.

The ring plate valve 455 is of an outside diameter large enough to close the small holes 417, 418 arranged in double rows around the bolt hole 416, and has small holes 456 defined in registration with the inner small holes 417 and having a diameter smaller than that of the small holes 417. The ring-shaped valve 465 has an outside diameter large enough to close the inner small holes 417 and also close substantially half of the cross section of flow passages through the outer small holes 418. The upper and lower valves 455, 465 and their associated members jointly constitute a valve mechanism 450.

A liquid is filled and sealed in a liquid chamber 402 and the auxiliary chamber 442 in the fluid-sealed engine mounting 401 thus constructed. In a free state of the fluid-sealed engine mounting 401, a connector 420 is positioned upwardly of the cylindrical body 415. The upper valve 455 is urged by the coil spring 457 downwardly to close the outer small holes 418, and the lower valve 465 is urged by the coil spring 467 upwardly to close the inner small holes 417.

The fluid-sealed engine mounting 401 will operate as follows:

When a downward shock of a large amplitude is imposed on the mounting 401 due to transient vibration at the time the engine is started or while the engine is in operation, the liquid chamber 402 is contracted to increase the pressure of the liquid in the liquid chamber 402. The liquid flow under pressure from the liquid chamber 402 is restricted by the small holes 456 in the upper valve 455, and then goes through the small holes 456 into the inner small holes 417 in the partition 411, causing the lower valve 465 to move downwardly against the resilient force of the coil spring 467 to allow the liquid to flow into the auxiliary chamber 442.

When an upward shock is imposed, the liquid chamber 402 is expanded to reduce the pressure of the liquid in the liquid chamber 402. The liquid flow from the auxiliary chamber 442 is restricted by the outer peripheral edge of the lower valve 465, and then enters into the outer small holes 418 in the partition 411. The upper valve 455 is now lifted by the liquid flow through the small holes 418 against the resiliency of the coil spring 457, thus permitting the liquid to flow into the liquid chamber 402.

In each of the contraction and expansion modes, the liquid chamber 402 produce different dampening forces prior and subsequent to the opening of the lower valve 465 or the upper valve 455. The fluid-sealed engine mounting shown in FIG. 15 can have a mounting-flexing-speed vs. sealed-liquid-pressure characteristic curve, as shown in FIG. 16, which is composed of two functions and has an inflection point A. The fluid-sealed engine mounting having such a characteristic curve can smoothly follow transient vibrations occurring as when the engine is started. The inflection point A represents a point of time when the upper valve 455 or the lower valve 465 is opened. The broken-line curve shown in FIG. 16 indicates conventional simple dampening characteristics obtained with an orifice only, that is, simple characteristics composed of a quadratic curve.

Figure 17:
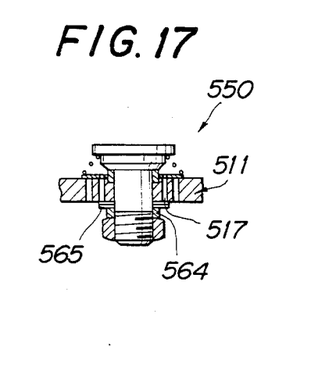
FIGS. 17 and 18 are cross-sectional views of modifications of the valve mechanism shown in FIG. 15.
Figure 18:
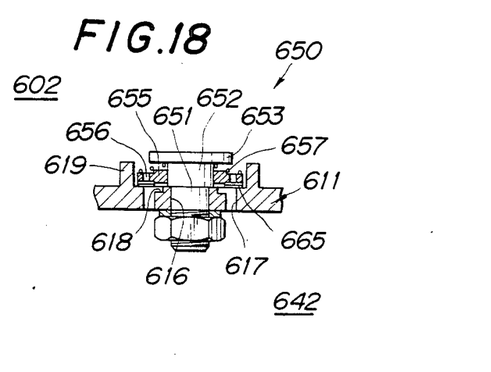

FIGS. 17 and 18 show modified valve mechanisms. The valve mechanism 550 shown in FIG. 17 is basically of the same construction as that of the valve mechanism shown in FIG. 15.

As shown in FIG. 17, a lower valve comprises a leaf spring valve 565 sandwiched between a lower surface of a partition 511 and an upper end of a sleeve 564. The leaf spring valve 565 serves to close inner small holes 517 only defined in the partition 511. The valve mechanism 550 thus constructed can serve the same purpose as that of the valve mechanism of the previous embodiment.

In FIG. 18, a partition 611 has small holes 617 defined therein in a circular pattern around a bolt hole 616 and having upper recesses 618, respectively, extending radially inwardly for an increased cross-sectional area of a flow passage. A bolt 651 is inserted from above through the bolt hole 616. A ring plate valve 655 is loosely fitted around the bolt 651. A coil spring 657 is disposed under compression between the ring plate valve 655 and a spring seat 653 on a bolt head 652. The valve 655 has small holes 656 defined therein in registration with the small holes 617, respectively. A leaf spring valve 665 is fixed to a lower surface of the valve 655 for closing the small holes 656 from below. The partition 611 has a ring-shaped ridge 619 projecting from an upper surface thereof and extending around the small holes 617. A liquid flow flowing from an auxiliary chamber 642 into a liquid chamber 602 is restricted between an inner peripheral surface of the ring-shaped ridge 619 and an outer peripheral surface of the valve 655. The valve mechanism 650 thus constructed can serve the desired purpose.

The fluid-sealed engine mounting according to the present invention may incorporate any other valve mechanisms having a flexing-speed vs. liquid pressure characteristic curve with an inflection point which approximates a broken line.

Figure 19:
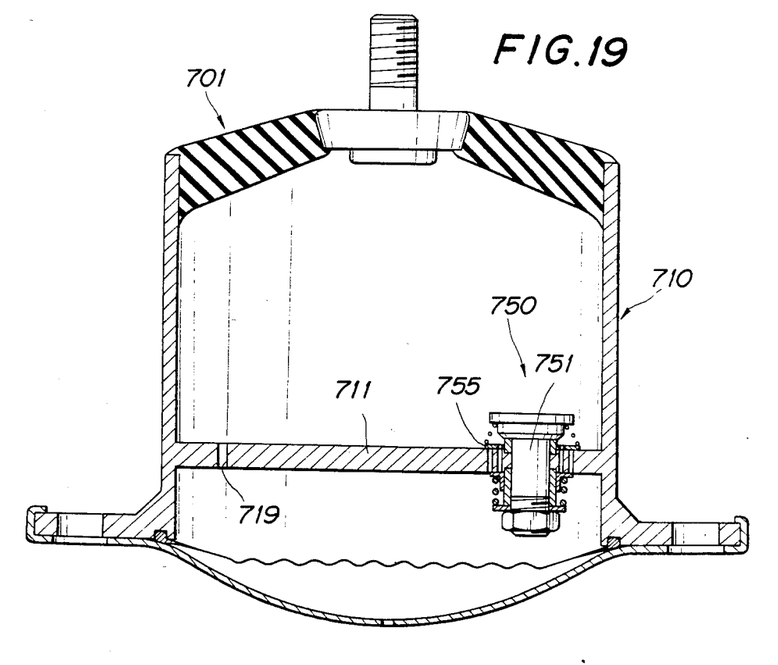
FIG. 19 is a vertical cross-sectional view of a modification of the fifth embodiment.

In the fifth embodiment, the upper valve of the valve mechanism has small holes for producing dampening forces. FIG. 19 shows a fluid-sealed enging mounting 701 having an orifice defined in a partition separately from a valve mechanism.

As shown in FIG. 19, the fluid-sealed enging mounting 701 includes a valve mechanism 750 mounted on a partition 711 off the center of a cylindrical body 715 of a base 710. The valve mechanism 750 has an upper valve 755 with no small holes defined therein. The partition 711 has an orifice 719 defined therein at an off-center position in diametrically opposite relation to the valve mechanism 750. The orifice 719 allows the enging mounting 701 to provide sufficient dampening characteristics in a low RPM range of an engine.

With the arrangement shown in FIG. 19, the valve mechanism 750 is simpler in construction as it does not have a dampening mechanism composed of small holes or slits.

Figure 20:
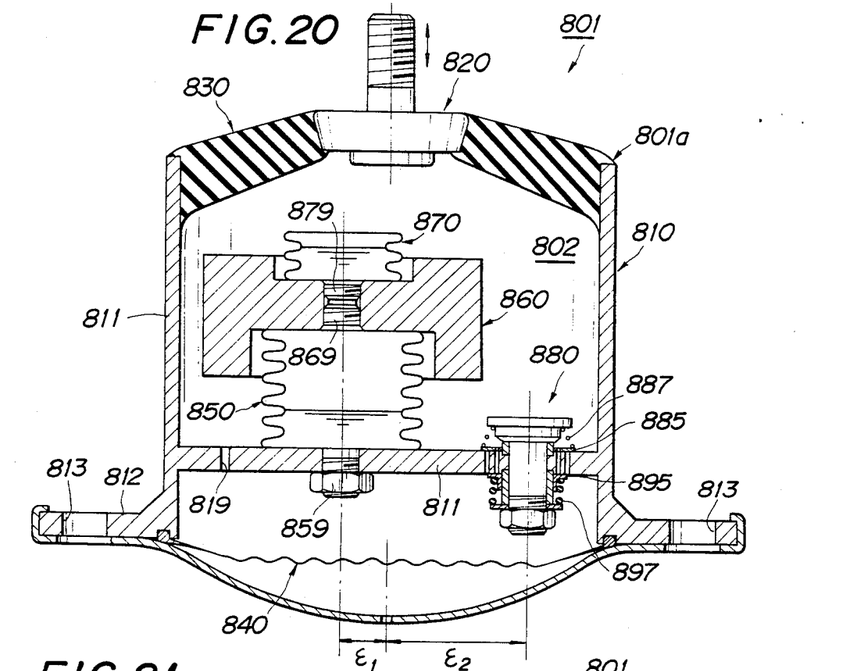
FIG. 20 is a vertical cross-sectional view of a fluid-sealed engine mounting according to a sixth embodiment of the present invention, the engine mounting comprising a combination of the vibration isolating device shown in FIGS. 1 through 13 and the dampening device shown in FIGS. 15 through 19.

FIG. 20 is illustrative of a fluid-sealed engine mounting 801 comprising a combination of the vibration isolating device shown in FIGS. 1 through 13 and the dampening mechanism shown in FIGS. 15 through 19. Although not shown, various combinations of the illustrated mounting structures are possible.

Figure 21:
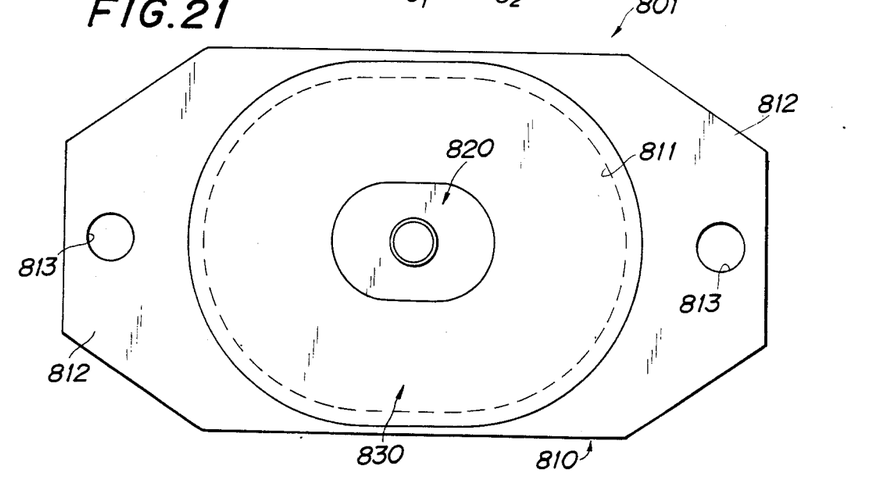
FIG. 21 is a plan view of the fluid-sealed engine mounting illustrated in FIG. 20.

As shown in FIG. 20, the fluid-sealed engine mounting 801 comprises a base 810, a connector 820, an elastic member 830, a diaphragm 840, and an under cover 845 which are identical to those depicted in FIG. 15. As shown in FIG. 21, a cylindrical body 811 of the base 810, the connector 820, and the elastic member 830 have elliptical configurations when viewed in plan. The base 810 has flanges 812 extending radially outwardly in the direction aligned with a major axis of the elliptical configurations. The flanges 812 have attachment holes 813 positioned on the major axis for passages of bolts for attachment to a vehicle frame.

The fluid-sealed engine mounting 801 has a first variable-volume member 850 comprising a bellows of metal has a central axis displaced a distance $\epsilon_1$, off the center of the elliptical cylindrical body 811, or the center C of a body 801a of the engine mounting 801, in the direction of the major axis. The bellows 850 is fastened to an upper surface of the partition 811 by an attachment bolt 859. As with the mounting shown in FIG. 7, a weight 860 in the form of a thick circular plate is fixed concentrically to an upper end surface of the bellows 850 by means of a bolt 869.

A second variable-volume member 870 comprises a bellows of metal fastened concentrically to a central upper surface of the weight 860 by means of a bolt 879.

A valve mechanism 880, identical to that shown in FIG. 15, is mounted on the partition 811 at a position displaced a distance $\epsilon_2$ off the center C of the elliptical cylinderical body 811 remotely from the first bellows 850, the weight 860, and the second bellows 870.

The partition 811 has an orifice 819 defined therein on the major axis thereof and positioned radially outwardly of the first bellows 850.

The fluid-sealed engine mounting 801 thus constructed has a capability of reducing transmission of vibrations at low and medium frequencies to the vehicle body because of the first bellows 850 and the weight 860, a capability of reducing transmission of vibrations at high frequencies to the vehicle body because of the second bellows 870, and also a capability of dampening transient engine vibrations as at the time the engine is started because of the valve mechanism 880.

Figure 22:
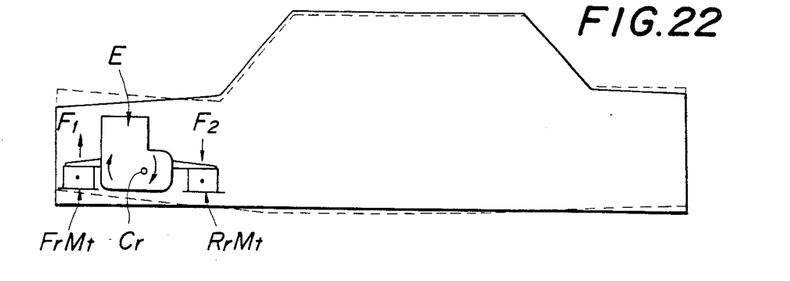
FIG. 22 is a side elevational view of a vehicle, illustrative of the manner in which engine mountings are subjected to moments by an engine being driven.

Since the cylindrical body 811 defining the liquid chamber 802 is elliptical in shape when viewed in plan, the vibration reducing devices 850, 860, 870 and the transient vibration dampening device 880 can be located off center in the liquid chamber 802 for improved efficiency. This arrangement can prevent the body 801a from being increased in size.

Where an engine E having a transverse crank shaft Cr as shown in FIG. 22 is mounted on a vehicle, a front engine mounting FrMt is subjected to an upward force $F_1$ as a moment and a rear engine mounting RrMt is subjected to a downward force $F_2$ as a moment due to the direction of rotation of the crank shaft Cr.

Figure 23:
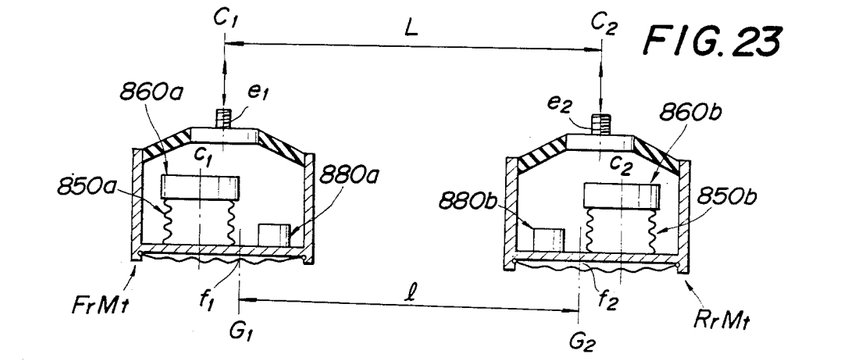
FIG. 23 is a vertical cross-sectional view of an arrangement of fluid-sealed engine mountings according to the embodiment of FIG. 20.

FIG. 23 shows an engine mounting arrangement composed of fluid-sealed engine mountings according to the embodiment of FIG. 20 for reducing a moment tending to bend a vehicle body.

The engine E is mounted on the vehicle body such that a bellows 850a disposed in the front engine mounting FrMt off center by a distance $\epsilon_1$ has a center $c_1$ located forward of a mounting point $e_1$ of the engine E, and a bellows 850b disposed in the rear engine mounting RrMt off center by the distance $\epsilon$ has a center $c_2$ located forward of a mounting point $e_2$ of the engine E. The front and rear engine mountings FrMt, RrMt also have weights 860a, 860b, respectively, and valve mechanisms 880a, 880b, respectively.

The mounting points $e_1$, $e_2$ of the engine E coincide with the centers $c_1$, $c_2$, respectively, of the front and rear engine mountings FrMt, RrMt. Mounting points $f_1$, $f_2$ in which the front and rear engine mountings are mounted on a vehicle frame coincide respectively with centers of gravity $G_1$, $G_2$ of the front and rear engine mountings FrMt, RrMt, respectively. A span L between the mounting points $e_1$, $e_2$ of the engine E is longer than a span l between the mounting points $f_1$, $f_2$ on the vehicle frame. This arrangement can reduce a bending moment acting on the vehicle frame, and hence suppress vibrations tending to bend the vehicle body and resonance thereof.

While in the above embodiment the engine with the transverse crank shaft has been shown and described, the present invention is applicable to an engine having a longitudinal crank shaft. In such an application, the engine mounting arrangement is incorporated in lateral engine mountings. Briefly summarized, the engine mounting arrangement shown in FIGS. 22 and 23 resides in that in mounting an engine, engine mountings in which variable-volume members are positioned off center are disposed in opposite positions laterally of the axis of an engine crank shaft, and the centers of the variable-volume members are located outwardly of mounting points of the engine.

While the engine E with the transverse crank shaft as shown in FIG. 22 is in operation, the front engine mounting FrMt is expanded at all times under an upward force applied thereto, and the rear engine mounting RrMt is contracted at all times under a downward force applied thereto.

For smoothly dampening shocks produced by the engine driven when starting and accelerating the vehicle, it is preferable that the front and rear engine mountings FrMt, RrMt have difference dampening characteristics to require a larger force for expanding the front engine mounting FrMt than for contracting the same in the same engine RPM range, and also require a larger force for contracting the rear engine mounting RrMt than for expanding the same in the same engine RPM range.

To achieve such characteristics in the engine mounting construction such as shown in FIG. 20, for example, the following adjustment should be made. Assuming that the engine mounting 801 is a front engine mounting FrMt and is subjected to an upward force from the engine in the same engine RPM range, the liquid chamber 802 is expanded. To reduce the rate of expansion of the liquid chamber 802, the spring 887 for resiliently urging the upper valve 885 of the valve mechanism 885 in a closing direction is set to a stronger spring force. Conversely, assuming that the engine mounting 801 is a rear engine mounting RrMt and is subjected to a downward force from the engine in the same engine RPM range, the liquid chamber 802 is contracted. To reduce the rate of contraction of the liquid chamber 802, the spring 897 for resiliently urging the lower valve 895 in a closing direction is set to a stronger spring force.

Figure 24:
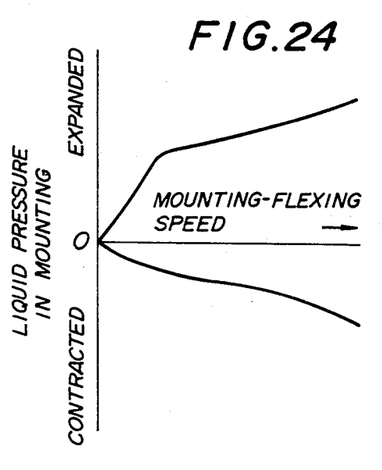
FIGS. 24 and 25 are graphs showing mounting-flexing-speed vs. sealed-liquid-pressure characteristic curves of front and rear fluid-sealed engine mountings disposed forward and rearward of the engine.
Figure 25:
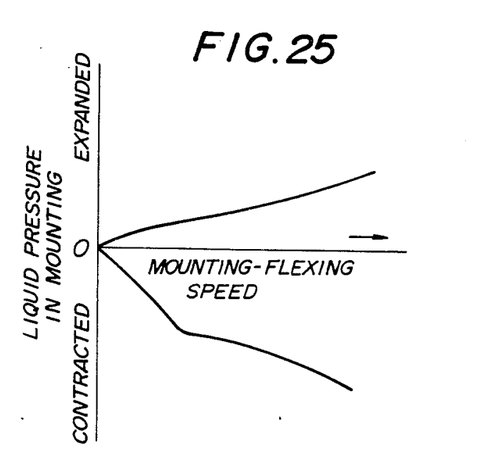

FIGS. 24 and 25 show characteristic curves of mounting flexing speeds plotted against liquid pressures in the mountings with the valve springs of the valve mechanisms being thus set. The characteristic curve illustrated in FIG. 24 is representative of the front engine mounting FrMt, while the characteristic curve illustrated in FIG. 25 is representative of the rear engine mounting RrMt.

Instead of the valve mechanism shown in FIG. 20, the valve mechanism illustrated in FIG. 17 or 18, or another valve mechanism type may be employed for incorporation in each of the front and rear engine mountings.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A fluid-sealed engine mounting for mounting an engine on a vehicle frame, comprising:
    (a) a connector adapted to be connected to the engine;
    (b) a base adapted to be connected to the vehicle frame;
    (c) an elastic member jointing said connector and said base to each other;
    (d) said connector, said base and said elastic member jointly defining a fluid chamber in which a fluid is sealed; and
    (e) a first variable-volume member mounted on one of said connector and said base in said fluid chamber and containing a gas and a liquid sealed therein, said first variable-volume member being expandable and contractable in a direction in which vibrations are transmitted in said fluid chamber.

2. A fluid-sealed engine mounting according to claim 1, wherein said first variable-volume member comprises a bellows of metal.

3. A fluid-sealed engine mounting according to claim 1, further including a weight secured to a free end of said first variable-volume member.

4. A fluid-sealed engine mounting according to claim 3, further including means in said fluid chamber for limiting movement of said weight.

5. A fluid-sealed engine mounting according to claim 1, further including a diaphragm attached to said base remotely from said fluid chamber, said diaphragm and said base jointly defining an auxiliary chamber communicating with said fluid chamber, said base having a partition extending between said fluid chamber and said auxiliary chamber, said first variable-volume member being mounted on said partition.

6. A fluid-sealed engine mounting according to claim 5, further including a valve mechanism mounted on said partition for communication between said fluid and auxiliary chambers and comprising a valve and means for resiliently urging said valve in a closing direction.

7. A fluid-sealed engine mounting according to claim 6, wherein said valve is openable in a direction in which a force is imposed by the engine being driven, said means for resiliently urging said valve having a relatively large resilient force for closing said valve.

8. A fluid-sealed engine mounting according to claim 6, wherein said fluid chamber has an elliptical configuration.

9. A fluid-sealed engine mounting for mounting an engine on a vehicle frame, comprising:
(a) a connector adapted to be connected to the engine;
(b) a base adapted to be connected to the vehicle frame;
(c) an elastic member jointing said connector and said base to each other;
(d) said connector, said base and said elastic member jointly defining a fluid chamber in which a fluid is sealed;
(e) a first variable-volume member mounted on one of said connector and said base in said fluid chamber and containing at least a gas sealed therein, said first variable-volume member being expandable and contractable in a direction in which vibrations are transmitted in said fluid chamber;
(f) a weight secured to a free end of said first variable-volume member; and
(g) a second variable-volume member secured to said weight remotely from said first variable-volume member and containing at least a gas sealed therein, said second variable-volume member being expandable and contractable in said direction in which vibrarions are transmitted in said fluid chamber.

10. A fluid-sealed engine mounting according to claim 9, wherein said second variable-volume member contains a gas and a liquid sealed therein.

11. A fluid-sealed engine mounting for mounting an engine on a vehicle frame, comprising:
(a) a connector adapted to be connected to the engine;
(b) a base adapted to be connected to the vehicle frame;
(c) an elastic member jointing said connector and said base to each other;
(d) said connector, said base and said elastic member jointly defining a fluid chamber in which a fluid is sealed; and
(e) a first variable-volume member mounted on one of said connector and said base in said fluid chamber and containing at least a gas sealed therein, said first variable-volume member being expandable and contractable in a direction in which vibrations are transmitted in said fluid chamber and being displaced off the center of said fluid chamber.

12. An arrangement of fluid-sealed engine mountings according to claim 11, further an engine having a crank shaft, said fluid-sealed engine mountings being disposed in opposite positions laterally of an axis of the crank shaft of the engine, said first variable-volume member having a center located outwardly of a center of each of said fluid-sealed engine mountings.

* * * * *